Nov. 6, 1934.  W. S. RANDEL ET AL  1,979,704
METHOD OF PRODUCING HIGH STRENGTH CALCINED GYPSUM
Filed Aug. 5, 1930  5 Sheets-Sheet 2
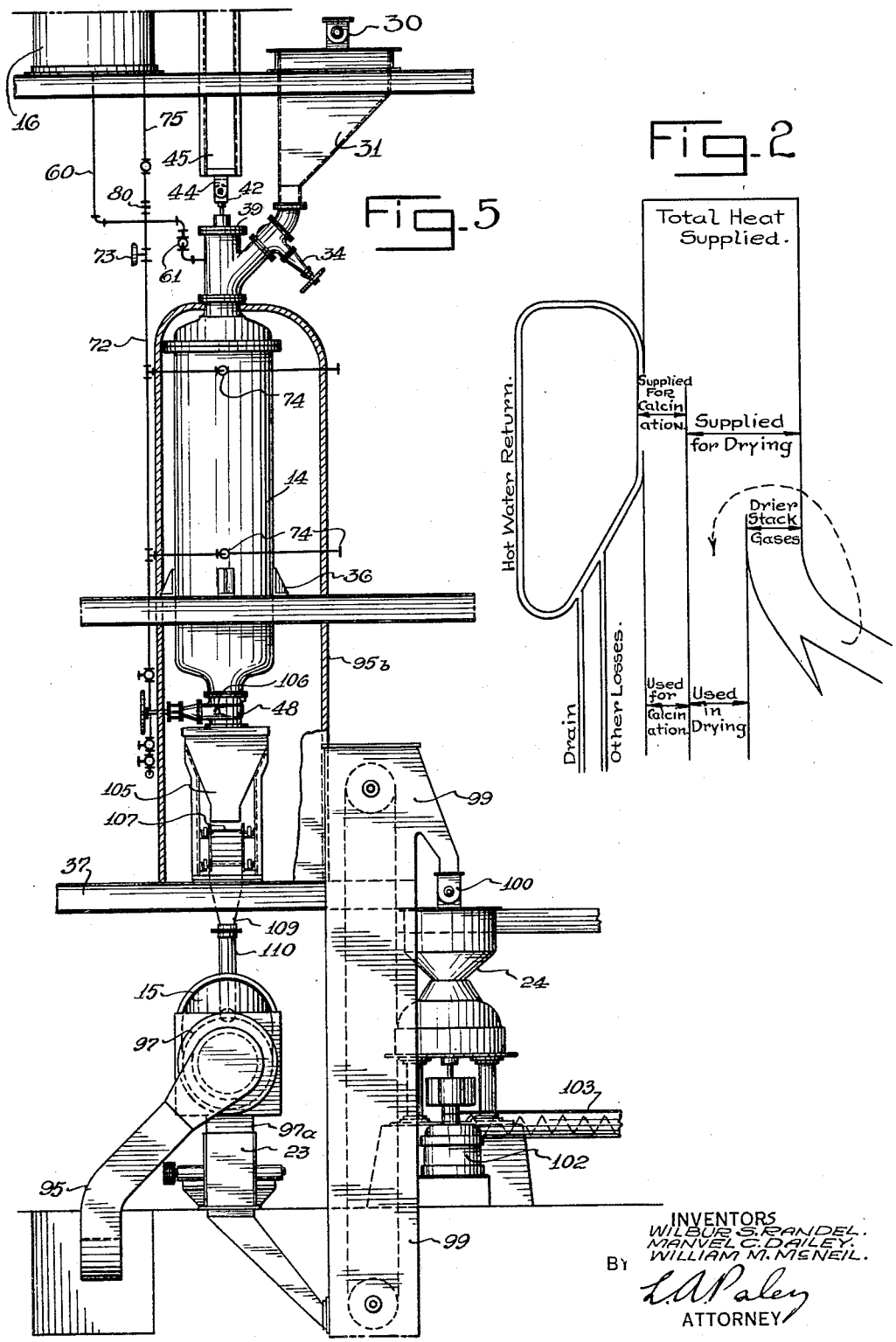
INVENTORS
WILBUR S. RANDEL.
MANVEL C. DAILEY.
WILLIAM M. McNEIL.
BY
L. A. Paley
ATTORNEY

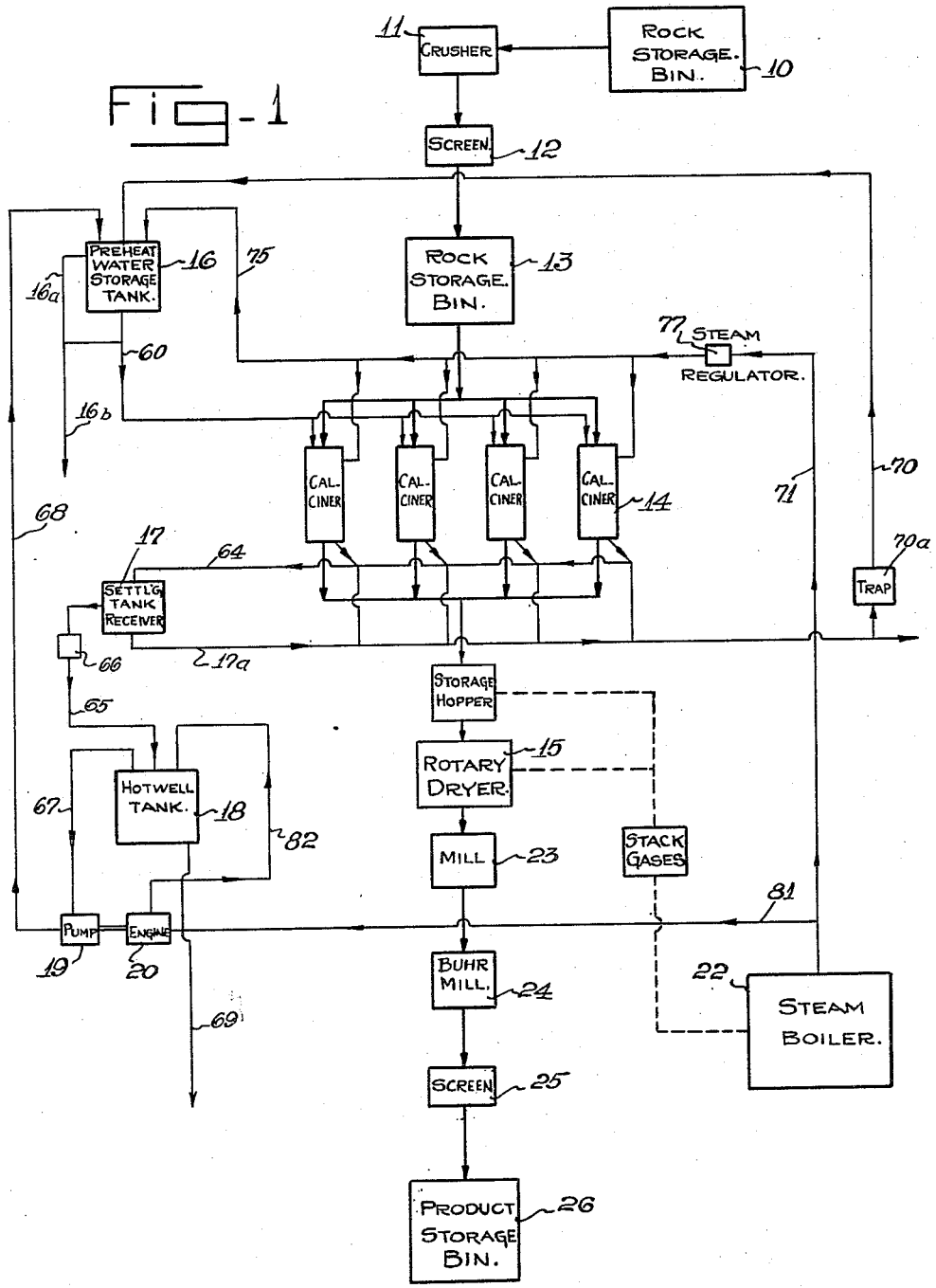

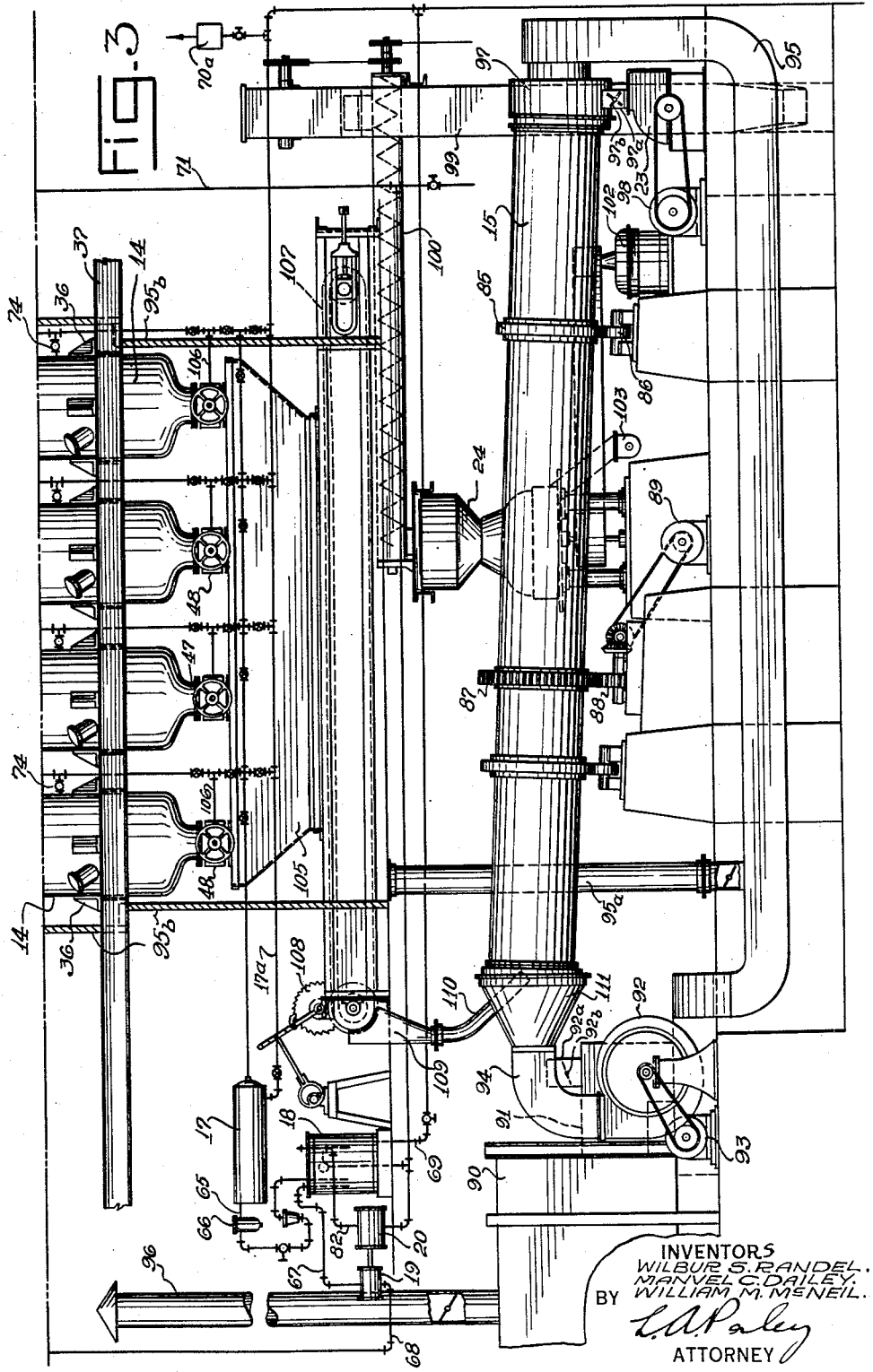

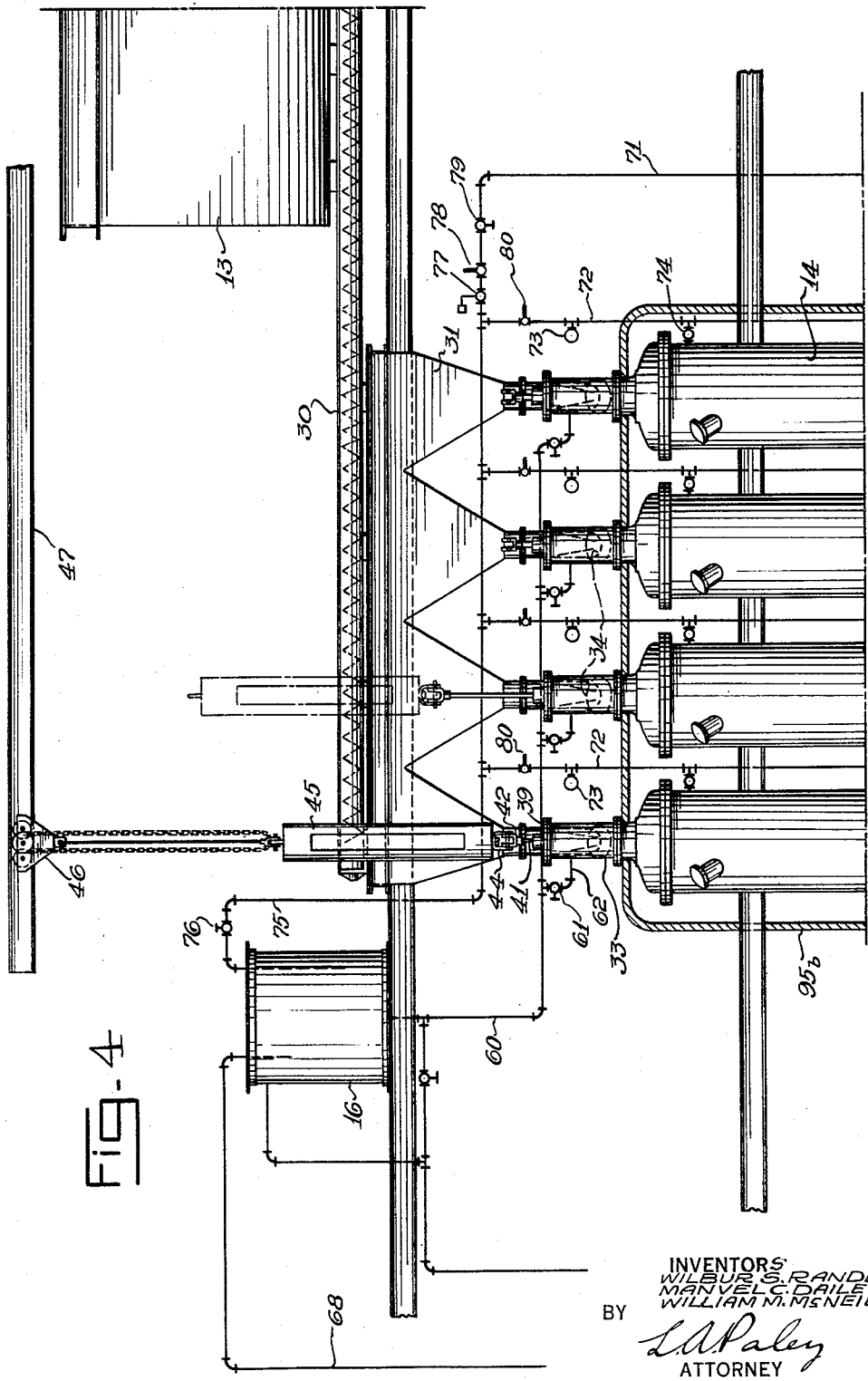

Nov. 6, 1934.    W. S. RANDEL ET AL    1,979,704
METHOD OF PRODUCING HIGH STRENGTH CALCINED GYPSUM
Filed Aug. 5, 1930    5 Sheets-Sheet 5
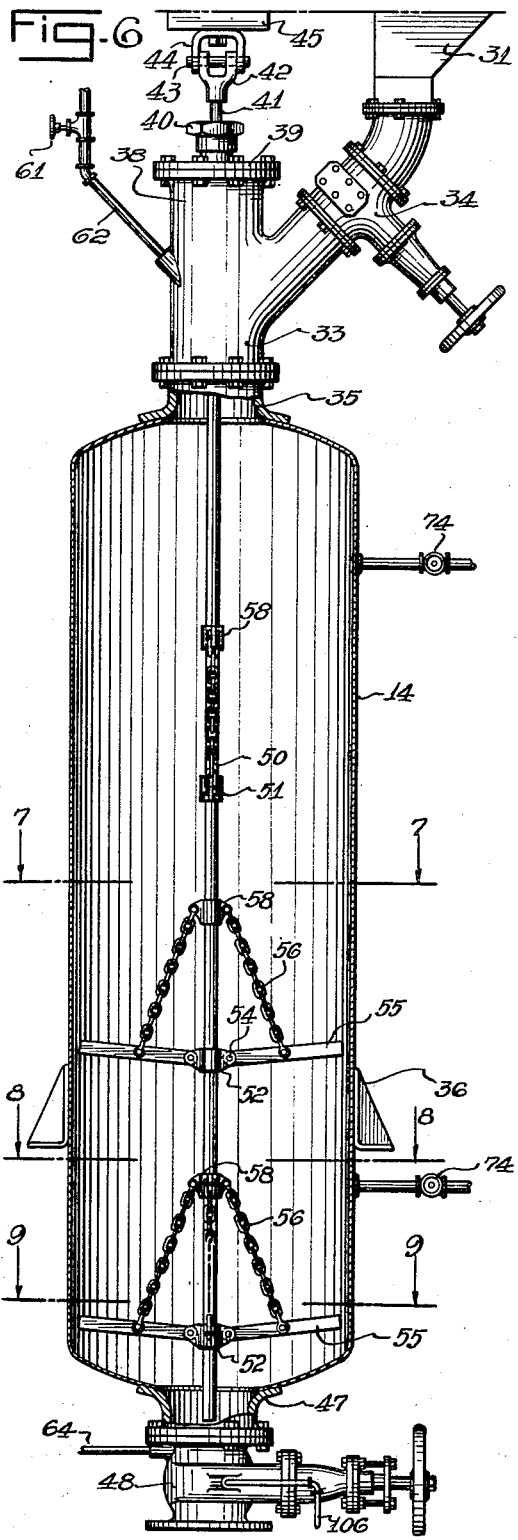
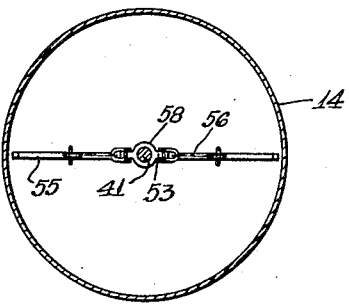
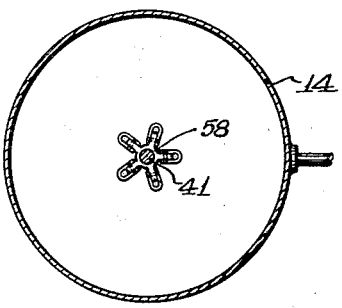
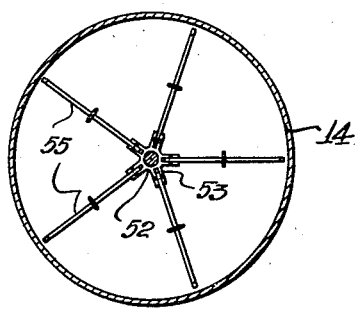
INVENTORS
WILBUR S. RANDEL.
MANVEL C. DAILEY.
WILLIAM M. McNEIL.
BY
L. A. Paley
ATTORNEY Patented Nov. 6, 1934

1,979,704

UNITED STATES PATENT OFFICE 1,979,704

METHOD OF PRODUCING HIGH STRENGTH CALCINED GYPSUM

Wilbur S. Randel, Manvel C. Dailey, and William M. McNeil, Chicago, Ill., assignors to United States Gypsum Company, Chicago, Ill., a corporation of Illinois Application August 5, 1930, Serial No. 473,182

6 Claims. (Cl. 23—122)

This invention relates to a method of calcining or heating a cementitious product for the purpose of producing a high strength product.

In the co-pending application of Randel and Dailey, Serial No. 384,343, filed August 9, 1929, now Patent No. 1,901,051, entitled "Calcined gypsum", a method and product is described in which gypsum rock is calcined to produce a calcined gypsum having an unusually high strength when cast into shapes. The present application covers a method suitable for producing this high strength calcined gypsum on a large scale and in an economical manner.

In the gypsum industry in the ordinary manufacture of kettle-calcined plasters, gypsum rock is ground up to form a powder, this powder is introduced into large kettles, and the kettles are heated externally and also by means of internal fire tubes passing through same. The powder is agitated while being heated and the heating causes steam to be produced as a result of partial dehydration of the gypsum, and the steam evolved from the heating of the powder passes up through the mass of powder, being constantly given off at atmospheric pressure. The results obtained by ordinary kettle calcination are not uniform and the product is apt to vary in strength and composition. The ordinary first settle calcined gypsum is composed of a mixture chiefly of calcium sulphate, hemihydrate and soluble anhydrite, with hemihydrate predominating. It is practically impossible to produce pure hemihydrate by the kettle process of calcination. Furthermore, the strength of the resulting product is comparatively low and does not place it in a field of use comparable to that of Portland cement and certain other cementitious materials. This kettle process is also uneconomical and has a low thermal efficiency, so that the cost of operation is comparatively high.

An object of this invention, therefore, is to provide a method of calcining gypsum under steam pressure so that a uniform product consisting substantially entirely of calcium sulphate hemihydrate is produced.

A further object of the invention is to provide a method of steam calcining gypsum to produce a calcined gypsum having a high tensile and compressive strength; also to improve methods for calcining gypsum in other respects hereinafter specified and claimed.

Reference is to be had to the accompanying drawings forming a part of this specification, in which Fig. 1 is a flow sheet showing diagrammatically the flow of materials through an apparatus suitable for carrying out the present invention, Fig. 2 is a heat diagram showing the disposition of the total heat in our improved method or process, Fig. 3 is a side elevation of the lower part of our improved apparatus, Fig. 4 is a side elevation of the upper part of our apparatus, Fig. 5 is an end elevation of the lower part of the apparatus, Fig. 6 is a central sectional elevation through one of the steam calcination retorts, and Figs. 7, 8 and 9 are sectional views through the retort taken on lines 7—7, 8—8 and 9—9 respectively of Fig. 6.

The gypsum rock used in our process is usually obtained by mining or open quarrying and is brought to the manufacturing plant storage bin 10, Fig. 1 ready for processing. This raw gypsum rock has the formula $CaSO_4.2H_2O$, and after passing through our apparatus, it is calcined and reduced to a cementitious powder having formula $CaSO_4.\tfrac{1}{2}H_2O$. From the rock storage bin 10, the rock goes to a crusher 11 and then screen 12, being finally deposited in a secondary rock storage bin 13, preferably in the form of lumps ranging from ½" to 2" in diameter.

The rock from storage bin 13 is deposited in a series of vertical cylindrical calciners or retorts 14, arranged in parallel for successive operation, so that the net result is a continuous flow of calcined gypsum going through a rotary dryer 15. When the cold rock is first introduced into the retort, hot water from preheated water storage tank 16 is run into the calciner until the rock is completely submerged and the retort is full of water. This preheated water storage tank is kept hot by live steam introduced into same. The water in this tank is composed both of condensed steam spent in the chemical reaction and part of the water of crystallization from the gypsum rock which has been converted into free water, and is drained off from the calciners into a settling tank 17, and from there into a hot well tank 18. A pump 19 operated by steam engine 20, pumps the hot water from the hot well tank 18 into the preheated water storage tank 16. By submerging the cold rock in hot water run from tank 16 to the calciners, the temperature of the rock is immediately raised to a temperature of 100–150° F. This use of the heat in the waste condensate water for preheating the rock, produces marked economies in operation and shortens the calcination cycle. Filling the calciners with hot water at this time also serves to expel any air contained in the calciner, so that steam subsequently introduced into the calciner after draining off the hot water has free action on all parts of the rock in the calciner, thus giving a uniform calcination. A further function of the preliminary water treatment is to wash the dust and fine material from the lumps of gypsum, since this fine material would cake up in the retort and prevent the discharge of the calcined gypsum therefrom. Steam for the calcination, for the water tanks 16 and 18 and for the steam engine 20, is generated by a steam boiler 22 of standard construction. The calcination is accomplished by steam at 15 to 50 pounds per square inch gauge, operating for a period of five to seven hours and at a temperature of 225 to 300° F. A preferred method of operation is through the use of steam at 17 pounds per square inch gauge at a temperature of 253° F. for a period of five to seven hours.

The calcined gypsum delivered into the rotary dryer 15 is still in the form of lumps of approximately the same size as the lumps of raw rock first introduced into the calciner. This calcined lump gypsum is then conveyed to a grinding mill 23 of any suitable type for coarse grinding, and then is conveyed to a buhr mill 24 for the purpose of reducing the calcined gysum to a still finer particle size. Various grinding treatments may be used, followed by screening through the use of a screen 25 to produce products of different grades which are conveyed to a product storage bin 26.

Considering the apparatus now more in detail, conveyor 30, which may be a screw conveyor in a suitable housing, is used for conveying the raw rock from storage bin 13 into a series of innerconnected hoppers 31 located above the row of calciners 14, which may be four in number. The top of each calciner 14 is provided with a Y fitting 33 of large diameter, the outstanding arm of which is provided with a valve 34 for regulating the flow of rock from hopper 31 through the neck 35 of the calciner. The calciner 14 is preferably in the form of an elongated, vertical cylinder having suitable outstanding brackets 36 for supporting same on steel framework 37. The Y fitting 33 is provided with a vertical arm 38 having a cover 39 securely bolted thereto, and a stuffing box 40 is provided in said cover for making a tight sliding fit with an agitator rod 41 passing upwardly therethrough. The agitator rod 41 is provided on its upper end with a forked bracket 42, and a pin 43 pivotally connects said bracket with a second U shaped bracket 44 formed on the lower end of a pneumatic vibrator 45 of standard design. Any other type of reciprocating device may be used for rapidly reciprocating the agitator rod 41 in the stuffing box 40 during the discharge period. The pneumatic hammer 45 is conveniently attached at its upper end to a traveling hoisting crane 46, which travels along a track 47 from one of the hoppers 31 to the adjacent ones, so as to successively actuate different agitator rods 41 in the respective calciners 14. The lower end of calciner 14 is provided with an outlet neck 47, which is connected to a suitable valve 48 for retaining the rock in the calciner 14 and resisting the steam pressure therein.

The lower end of agitator rod 41 is provided with agitator brackets 51 and 52 each of which has preferably a pair of radially extending pivot arms 53. Pins 54 pivotally connect said arms 53 with the inward end of agitator bars 55, the latter extending radially from the rod 51. Chains 56 connect the bars 55 intermediate the ends thereof, to a suspension bracket 58 secured to the rod 41 above each of the brackets 51 and 52. By means of this method of suspending the agitator bars 55, the latter may be folded upwardly parallel to the rod 41 when said rod 41 is inserted through the neck 35. The bars 55 then fold downwardly to loosen the rock after the calcination period and cause same to flow out through the outlet neck 47. The bars connected to brackets 51 and 52 are preferably turned at right angles one to the other to obtain a proper loosening of the rock.

Hot water from the storage tank 16 flows through pipe 60 and through branch pipes 62 to the upstanding arms 38 of the calciners 14, said calciners being arranged in parallel with individual control valves 61 arranged on branch lines 62. Drain pipes 64 are connected to each of the valve bodies 48 in parallel and deliver into the pressure settling tank 17 where the fine gypsum dust or mud settles to the bottom and is cleaned out from time to time. Suitable valves are provided on the hot water outlet pipes 64 for controlling the flow of water. An outlet pipe 65 provided with a steam trap 66 leads from the settling tank 17 to the hot well tank 18. Suction pipe 67 extends into the top of tank 18 and is connected to the pump 19. Discharge pipe 68 is also connected to said pump and leads up to the hot water storage tank 16. The tank 16 is provided with an overflow pipe 16a and a drain pipe 16b. Hot water continually accumulates in the system due to condensation of steam as it gives up its heat in performing the chemical reaction of calcining the gypsum, and drain pipe 69 is provided in the tank 18 for passing any excess water to the drain. A pipe 70 provided with a trap 70a, may lead from a drain pipe 17a connected to tank 17 so as to discharge hot water into tank 16 if desired.

The steam generated in the steam boiler 22 passes through pipe line 71 and branch line 72 arranged in parallel. A pressure gauge 73 is positioned on each branch line 72, and each of said lines is connected to both the top and bottom of its respective calciner 14, a suitable shut-off valve 74 being provided on each inlet line. The line 71 continues to form a line 75 provided with valve 76, said line 75 extending downwardly into the hot water storage tank 16 so that the water can be kept hot by the injection of steam to make up heat losses through the insulation on said tank 16. A steam regulator valve 77 is provided on the line 71, together with a pop valve 78 and a shut-off valve 79. The pop valve 78 is adjusted to blow off at a predetermined maximum pressure, and the pressure reducing valve 77 may be adjusted for delivering steam to the branch lines 72 at any other lower pressure. An additional pop valve 80 is provided on each of the branch lines 72 in addition to the gauge 73. By this system of valve control on the steam lines leading to the calciners 14, the pressure of steam in said calciners is accurately controlled to produce a product having the highest maximum strength with the greatest manufacturing economy.

A steam line 81 leads from the line 71 to the engine 20 so as to supply steam for the operation of said engine. A steam line 82 leads from the engine 20 and delivers steam into the water contained in the hot well tank 18, so as to maintain a high temperature of said water to make up heat losses through the insulation on said tank 18.

The rotary dryer 15 is of the usual type, consisting of a cylindrical shell inclined slightly to the horizontal and having circular rings 85 operating on rollers 86. A ring gear 87 is driven by spur gear 88 operated through suitable gearing by a motor 89. A heating furnace 90, preferably of the oil fired type, is connected by duct 91 to the suction side of a rotary fan 92 operated by a motor 93. A discharge duct 94 connects the fan 92 with the upper end of the dryer 15, so that hot products of combustion from the furnace 90 are passed directly through the dryer 15 and then through a duct 95 back to the furnace 90. The furnace 90 is provided with a stack 96 having a control damper, this stack being useful in starting but not during a continuous run. A fresh air inlet pipe 92a is connected to the duct 91 and is provided with a damper 92b for controlling the amount of fresh air continually admitted to the system. A waste gas outlet pipe 95a is connected between the duct 95 and a housing 95b which surrounds the hopper 105 and the retorts 14 to prevent heat losses in the retorts and to prevent or retard recrystallization of the calcined gypsum in the presence of free moisture in the hopper 105. This use of the waste gases as an insulating medium around the calciners results in large heat economies.

The material leaving the lower housing 97 of the dryer 15, passes through a duct 97a having a star feeder 97b, to the mill 23 which is operated by motor 98 to accomplish the preliminary grinding of the material. From the grinder 23, the ground material passes upwardly through a bucket elevator 99 and then through a screw conveyor 100 to the buhr mill 24 operated by a motor 102. The finely ground material then passes through a conveyor 103 to any other subsequent treating apparatus, such as screen 25.

In order to collect the material flowing from the calciner 14, a hopper 105 is provided below said calciner so as to receive the discharged material from all of the outlet valves 48. In order to insure that all material is cleaned out from the valves 48, a steam line 106 may be attached to each valve for cleaning purposes. A drag chain conveyor 107 passes through the hopper 105 so as to cause movement of the material to the left as seen in Fig. 3, the movement of said conveyor being accomplished by means of a ratchet and pawl mechanism 108 operated by a suitable motor not shown. The conveyor 107 delivers the material into a collecting hopper 109, and said material then passes through a duct 110 into the upper housing 111 of the drier 15. Instead of the furnace 90 for producing the hot gases to dry the material, stack gases from the steam boiler 22 may be passed through the rotary drier 15, as shown in the dotted lines in Fig. 1. The heat diagram shown in Fig. 2, which is provided with explanatory notations, shows that a considerable economy of heat can be accomplished by utilizing the stack gases from the boiler.

In operation, the crushed rock is taken from storage bin 13 through conveyor 30 into feed hoppers 31. Upon opening valve 34, the crushed rock flows through pipe 33 and calciner neck 35 into the calciner 14, which is filled substantially full of the crushed rock with the lower valve 48 being closed. The calciner 14 is now filled with hot water from tank 16 through pipe 62 to expel the air in the calciner, wash fine material from the lumps of rock and preheat the rock. Steam is now turned on by opening valves 74 on the pipe lines leading into the top and bottom of the calciner 14. The valve controlling drain pipe 64 at the bottom of the calciner is now opened to permit the water to drain out. The drain valve is then closed and calcination of the gypsum is continued for a period of five to seven hours, keeping the steam pressure at 15 to 50 pounds per square inch pressure. The steam is then turned off by closing valves 74, and outlet valve 48 is opened. Pneumatic vibrator 45 is then run along on the track 47, being supported by the traveling crane hoist 46, until in position over the desired agitating rod 41. Pin 43 is then slipped into place and the vibration of the pneumatic hammer is started which causes the rapid up and down movement of rod 41 and agitating bars 55. This agitating movement loosens the calcined rock and causes same to flow outwardly through valve 48 into the receiving hopper 105 above the drag chain conveyor 107. Any number of the calciners 14 may be used to secure a proper cycle so that when the calciners are operated successively, a substantially continuous stream of calcined rock flows from the hopper 105.

The calcined rock delivered from the drag chain conveyor 107 flows into receiving hopper 109 and then through chute 110 into the upper end of the rotary drier 15. It is important that the transfer of calcined rock from the calciners 14 to the drier 15 takes place in the shortest possible interval of time so that the temperature of the rock does not drop to a point where recrystallization of the free moisture in the calcined gypsum takes place. Gaseous products of combustion at a high temperature are continuously passed through the rotary drier 15 and back through duct 95 to fan 92, some of the waste products of combustion being continuously vented outwardly through pipe 95a and inside the housing 95b which surrounds the hopper 105 and the retorts 14, new and hot products of combustion being supplied to the system by a furnace 90, preferably fired by oil or other suitable fuel. Fresh air is continuously admitted to the system through duct 92a. The drier 15 is continuously rotated and the calcined rock passes downwardly, being delivered from the lower housing 97, through duct 97a and star feeder 97b, into a grinder 23 where preliminary crushing and grinding takes place. The crushed product is then elevated by bucket elevator 99 into a screw conveyor 100 which transfers the material into a grinder 24, preferably of the buhr mill type or other type suitable for fine grinding. From this mill 24, the finely ground material 103 goes to a screen not shown, or other processing equipment, preparatory to storage and final packing for shipment.

We would state in conclusion that while the illustrated examples constitute a practical embodiment of our invention, we do not wish to limit ourselves precisely to these details, since manifestly, the same may be considerably varied without departing from the spirit of the invention as defined in the appended claims.

Having thus described our invention, we claim as new and desire to secure by Letters Patent:—

1. The method of calcining lump gypsum rock, which comprises expelling water of crystallization from said gypsum to form hot water, washing a new amount of gypsum rock with said hot water to preheat said rock, and draining the hot water from said rock to remove fine particles of gypsum from said rock prior to calcination.

2. The method of calcining gypsum, which comprises supporting a mass of gypsum in the form of lumps in an elongated vertical column in a confined space in a state of rest, introducing steam under carefully controlled predetermined temperature into said space for a period of time to expel water of crystallization from said gypsum, withdrawing condensed water from said space, and discharging the calcined gypsum from said space.

3. The method of calcining gypsum rock, which comprises supporting a mass of gypsum rock in the form of lumps in an elongated vertical column in a confined space in a state of rest, introducing steam under controlled pressure into said space so as to expel water of crystallization from said gypsum, reducing the steam pressure in said space, opening said space to the atmosphere at the bottom, and agitating the calcined gypsum rock to cause said rock to flow from said opened space.

4. A method of calcining gypsum, which comprises confining a mass of gypsum in lump form in a closed space, subjecting the gypsum in said space to the action of steam under controlled pressure, said steam being produced by the burning of fuel with the formation of waste stack gases, removing said calcined gypsum from said closed space, introducing said calcined gypsum into a drying zone, and subjecting the gypsum in said drying zone to the action of said waste stack gases in direct contact with said lumps to dry the same.

5. The method of calcining lump gypsum rock, which comprises converting part of the water of crystallization of said gypsum to free hot water by the action of steam under pressure, removing from said gypsum said free hot water and the hot water obtained from the condensation of heating steam, and applying said combined hot water to a further amount of gypsum rock to preheat said rock and to wash particles of loose gypsum therefrom.

6. In the process of calcining gypsum in lumps by means of steam under pressure, the step which comprises subjecting said lumps to the action of hot water to preheat the same and to wash loose gypsum particles therefrom.

WILBUR S. RANDEL.
MANVEL C. DAILEY.
WILLIAM M. McNEIL.